United States Patent
Jones et al.

(10) Patent No.: US 12,351,334 B2
(45) Date of Patent: *Jul. 8, 2025

(54) SYSTEMS AND METHODS FOR AUTONOMOUS AIRWORTHINESS PRE-FLIGHT CHECKS FOR UAVS

(71) Applicant: Wing Aviation LLC, Palo Alto, CA (US)

(72) Inventors: Brandon Jones, Palo Alto, CA (US); Kevin Jenkins, Dallas, TX (US); Damien Jourdan, San Jose, CA (US); André Prager, Sunnyvale, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,671

(22) Filed: Jan. 23, 2024

(65) Prior Publication Data

US 2024/0409235 A1 Dec. 12, 2024

Related U.S. Application Data

(63) Continuation of application No. 17/118,530, filed on Dec. 10, 2020, now Pat. No. 11,912,432.

(51) Int. Cl.
*B64C 39/02* (2023.01)
*B64D 45/00* (2006.01)
(Continued)

(52) U.S. Cl.
CPC ............ *B64D 45/00* (2013.01); *B64C 39/024* (2013.01); *B64U 10/25* (2023.01); *B64U 30/10* (2023.01);
(Continued)

(58) Field of Classification Search
CPC ............ B64D 45/00; B64D 2045/0085; B64C 39/024; B64U 50/13; G08G 5/57
See application file for complete search history.

(56) References Cited

U.S. PATENT DOCUMENTS 9,944,404 B1    4/2018   Gentry
10,053,236 B1 *   8/2018   Buchmueller ......... G01N 29/14
(Continued)

FOREIGN PATENT DOCUMENTS

CN     105980950 A    9/2016
CN     106687876 A    5/2017
(Continued)

OTHER PUBLICATIONS

European Patent Office, Extended European Search Report mailed on Apr. 22, 2024, issued in connection with European Patent Application No. 21904561.4, 10 pages.
(Continued)

*Primary Examiner* — Kito R Robinson
*Assistant Examiner* — Roy Rhee
(74) *Attorney, Agent, or Firm* — McDonnell Boehnen Hulbert & Berghoff LLP

(57) ABSTRACT

A method includes determining an operational condition associated with an unmanned aerial vehicle (UAV). The method includes, responsive to determining the operational condition, causing the UAV to perform a pre-flight check. The pre-flight check includes hovering the UAV above a takeoff location. The pre-flight check includes, while hovering the UAV, moving one or more controllable components of the UAV in accordance with a predetermined sequence of movements. The pre-flight check includes obtaining, by one or more sensors of the UAV, sensor data indicative of a flight response of the UAV to moving the one or more controllable components while hovering the UAV.
(Continued)

The pre-flight check includes comparing the sensor data to expected sensor data associated with an expected flight response to the predetermined sequence of movements while hovering the UAV. The pre-flight check includes, based on comparing the sensor data to the expected sensor data, evaluating performance of the UAV.

20 Claims, 12 Drawing Sheets

(51) Int. Cl.
*B64U 10/25* (2023.01)
*B64U 30/10* (2023.01)
*G08G 5/26* (2025.01)
*B64U 50/13* (2023.01)
*B64U 101/60* (2023.01)
*B64U 101/67* (2023.01)

(52) U.S. Cl.
CPC ....... *G08G 5/26* (2025.01); *B64D 2045/0085* (2013.01); *B64U 50/13* (2023.01); *B64U 2101/60* (2023.01); *B64U 2101/67* (2023.01); *B64U 2201/10* (2023.01); *B64U 2201/20* (2023.01)

(56) References Cited

U.S. PATENT DOCUMENTS

| | | |
|---|---|---|
| 2008/0125933 A1 | 5/2008 | Williams et al. |
| 2015/0344149 A1 | 12/2015 | Mumaw et al. |
| 2016/0244187 A1 | 8/2016 | Byers et al. |
| 2016/0246304 A1 | 8/2016 | Canoy et al. |
| 2017/0235018 A1* | 8/2017 | Foster ............... G05D 1/693 |
| | | 702/5 |
| 2018/0072417 A1 | 3/2018 | Shannon et al. |
| 2018/0090014 A1* | 3/2018 | Kline ............... G06Q 10/083 |

FOREIGN PATENT DOCUMENTS

| | | |
|---|---|---|
| CN | 107257765 A | 10/2017 |
| KR | 20160048276 | 5/2016 |
| WO | 2016179637 | 11/2016 |

OTHER PUBLICATIONS

China National Intellectual Property Administration, The First Office Action mailed Aug. 7, 2024, issued in connection with Chinese Patent Application No. 202180046492.6, 19 pages (with English translation).

International Searching Authority, International Search Report and Written Opinion mailed on Jan. 19, 2022, issued in connection with International Patent Application No. PCT/US2021/071671, filed Oct. 1, 2021, 10 pages.

* cited by examiner

SYSTEMS AND METHODS FOR AUTONOMOUS AIRWORTHINESS PRE-FLIGHT CHECKS FOR UAVS

CROSS-REFERENCE TO RELATED APPLICATIONS

This application is a continuation of and claims priority to U.S. patent application Ser. No. 17/118,530, filed Dec. 10, 2020, and titled "Systems and Methods for Autonomous Airworthiness Pre-Flight Checks for UAVs," which is hereby incorporated by reference as if fully set forth in this description.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Examples disclosed herein provide a method, a system, and a non-transitory computer-readable medium for performing a pre-flight check for a UAV.

In an embodiment, a method is provided. The method includes determining an operational condition associated with an unmanned aerial vehicle (UAV). The method also includes, responsive to determining the operational condition, causing the UAV to perform a pre-flight check. The pre-flight check includes hovering the UAV above a takeoff location. The pre-flight check includes, while hovering the UAV, moving one or more controllable components of the UAV in accordance with a predetermined sequence of movements. The pre-flight check includes obtaining, by one or more sensors of the UAV, sensor data indicative of a flight response of the UAV to moving the one or more controllable components while hovering the UAV. The pre-flight check includes comparing the sensor data to expected sensor data associated with an expected flight response to the predetermined sequence of movements while hovering the UAV. The pre-flight check includes, based on comparing the sensor data to the expected sensor data, evaluating performance of the UAV.

In another embodiment, a system is provided. The system includes an unmanned aerial vehicle (UAV). The system includes one or more processors, a non-transitory computer readable medium, and program instructions stored on the non-transitory computer readable medium. The instructions are executable by the one or more processors to determine an operational condition associated with the UAV. The instructions are executable by the one or more processors to, responsive to determining the operational condition, cause the UAV to perform a pre-flight check. The pre-flight check includes, while hovering the UAV, moving one or more controllable components of the UAV in accordance with a predetermined sequence of movements. The pre-flight check includes obtaining, by one or more sensors of the UAV, sensor data indicative of a flight response of the UAV to moving the one or more controllable components while hovering the UAV. The pre-flight check includes comparing the sensor data to expected sensor data associated with an expected flight response to the predetermined sequence of movements while hovering the UAV. The pre-flight check includes, based on comparing the sensor data to the expected sensor data, evaluating performance of the UAV.

In a further embodiment, a non-transitory computer readable medium is provided. The non-transitory computer readable medium has stored therein instructions executable by one or more processors to cause a computing system to perform functions. The functions include determining an operational condition associated with the UAV. The functions include, responsive to determining the operational condition, cause the UAV to perform a pre-flight check. The pre-flight check includes, while hovering the UAV, moving one or more controllable components of the UAV in accordance with a predetermined sequence of movements. The pre-flight check includes obtaining, by one or more sensors of the UAV, sensor data indicative of a flight response of the UAV to moving the one or more controllable components while hovering the UAV. The pre-flight check includes comparing the sensor data to expected sensor data associated with an expected flight response to the predetermined sequence of movements while hovering the UAV. The pre-flight check includes, based on comparing the sensor data to the expected sensor data, evaluating performance of the UAV.

In another embodiment, a system is provided. The system includes means for determining an operational condition associated with the UAV. The system includes means for, responsive to determining the operational condition, cause the UAV to perform a pre-flight check. The pre-flight check includes, while hovering the UAV, moving one or more controllable components of the UAV in accordance with a predetermined sequence of movements. The pre-flight check includes obtaining, by one or more sensors of the UAV, sensor data indicative of a flight response of the UAV to moving the one or more controllable components while hovering the UAV. The pre-flight check includes comparing the sensor data to expected sensor data associated with an expected flight response to the predetermined sequence of movements while hovering the UAV. The pre-flight check includes, based on comparing the sensor data to the expected sensor data, evaluating performance of the UAV.

These as well as other aspects, advantages, and alternatives will become apparent to those of ordinary skill in the art by reading the following detailed description with reference where appropriate to the accompanying drawings.

Further, it should be understood that the description provided in this summary section and elsewhere in this document is intended to illustrate the claimed subject matter by way of example and not by way of limitation.

DETAILED DESCRIPTION

Figure 1:
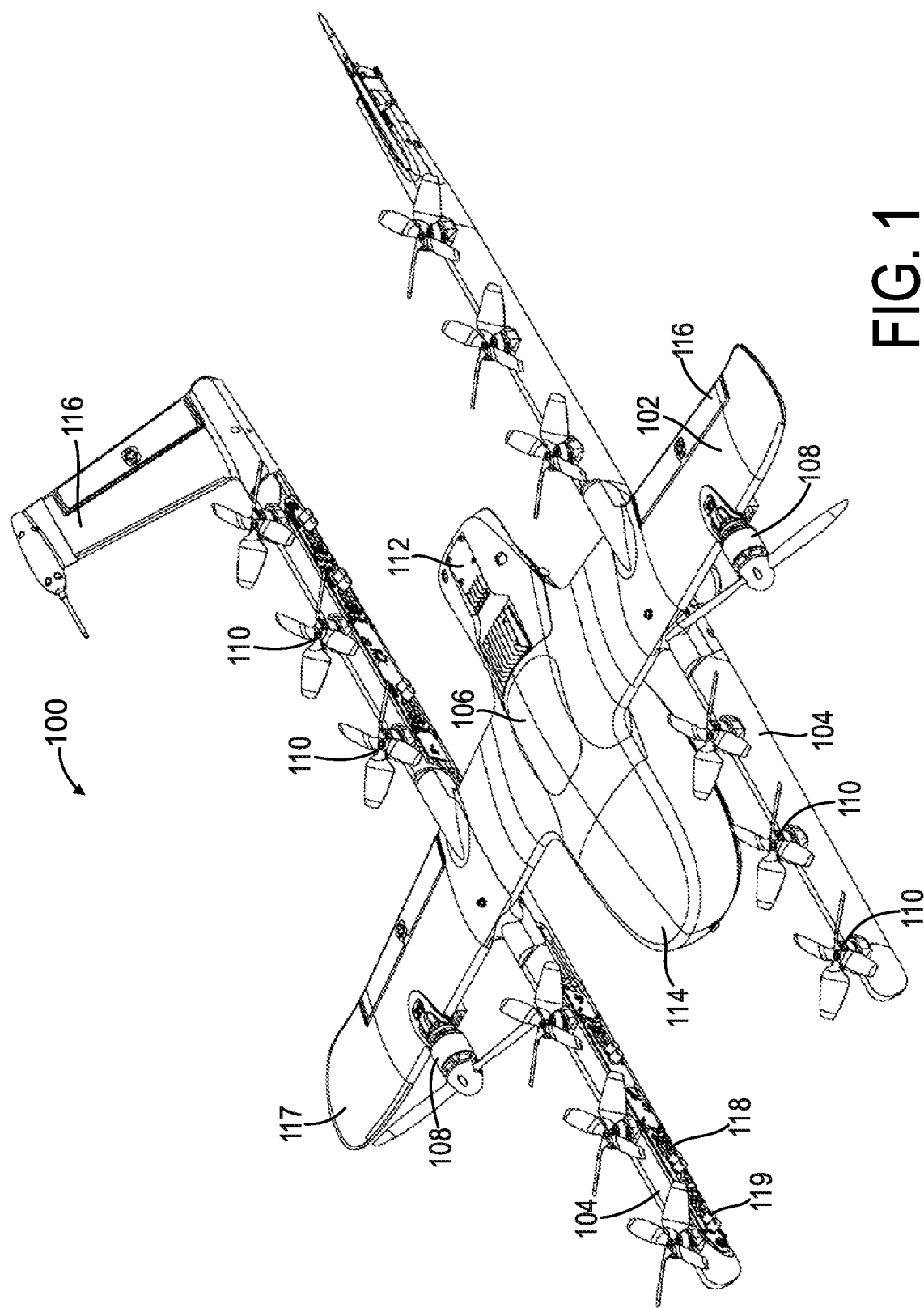
FIG. 1 is an isometric view of an example unmanned aerial vehicle, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "of" within a described list of at least two terms is to indicate any of the listed terms or any combination of the listed terms.

The use of ordinal numbers such as "first," "second," "third" and so on is to distinguish respective elements rather than to denote a particular order of those elements. For the purposes of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Systems such as unmanned aerial vehicles (UAVs), or more generally, aerial vehicles, may operate in a fleet that includes a plurality of UAVs that are configured to carry out flight operations. The UAVs may perform flight operations, such as payload delivery operations, and over the course of multiple flight operations may incur damage, require replacement of one or more components, or may experience general wear and tear. A system may determine an operational condition associated with a UAV that triggers a pre-flight check. For example, the operational condition may be indicative of a threshold amount of use of the UAV or an indication that the UAV is damaged, or the operational condition may be associated with an environment of the UAV, such as a weather condition. The system may cause the UAV to automatically perform the pre-flight check in response to determining the operational condition.

Within examples, the system may include a computing device that serves as a controller of a fleet of UAVs. The computing device may track aspects of each UAV, such as a number of flight operations, maintenance schedules, detected part failures, or the like, which can be used for determining whether the UAV should perform a pre-flight check. The computing device can signal a UAV to perform the pre-flight check in known conditions with expected results. For example, the fleet of UAVs may dock at a charging location that is protected from environmental conditions, and the pre-flight check can be performed to take place within the charging location in order to obtain reliable results. In this manner, the system may evaluate performance of the UAV with increased confidence.

Within examples, UAVs may be tracked by one or more in-flight benchmarks that indicate that the UAV requires maintenance, or should be checked prior to a next flight operation. For example, the UAV may track battery usage, vibration levels, torque outputs, or other parameters during flight operations. The system may use an altered set of benchmarks for a pre-flight check of a UAV in which the UAV engages in a controlled pre-flight operation, such as while hovering the UAV. The UAV can automatically alter one or more variables by controlling components of the UAV, such as rotors, ailerons, elevators, rudders, servos, actuators, or other movable components of the UAV, and obtain sensor data to determine how the UAV reacts to these altered variables. The UAV, the computing device, or another device can compare the sensor data to expected data to evaluate performance of the UAV. This allows the system to systematically and consistently evaluate each UAV in the fleet under controlled conditions.

Within examples, the pre-flight check involves the UAV maintaining a stable orientation while hovering and while altering one or more variables using the controllable components. The pre-flight check involves determining a flight response of the UAV in maintaining the stable orientation while altering the variables, and compares these responses to expected values. For example, sensor data may indicate a torque applied by one or more rotors during the pre-flight check, and compare the torque values to expected values. If the torque exceeds a threshold difference from the expected values, the controller or the UAV may determine that maintenance of a particular component should be performed. By running through a consistent routine of controlling components of the UAV and tracking sensor data associated with a flight response of the UAV, the system can perform targeted analysis of which component is likely causing irregular flight responses during the pre-flight check. As used herein, the term "flight response" refers to an adjustment made by the UAV based on a force applied to the UAV. In the context of a pre-flight check, the flight response includes adjustments based on moving a controllable component. For example, an adjustment made by the UAV responsive to a roll torque induced by moving an aileron of the UAV would constitute a flight response in this context.

Within examples, the controller of the fleet of UAVs interfaces with a scheduling system to assign UAVs to flight operations and to schedule maintenance of the UAVs. The scheduling system may take pre-flight checks into account when assigning flight operations. For example, the scheduling system or the controller may assign a given UAV that has already performed a pre-flight check to perform a flight operation without delay, while other UAVs may be prompted to perform a pre-flight check prior to beginning the flight operation. In this manner, the scheduling system may expedite high-priority flight operations.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1 is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100.

In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may include one or more ailerons for improved roll control of UAV 100.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body molded around the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative Uav Components

Figure 2:
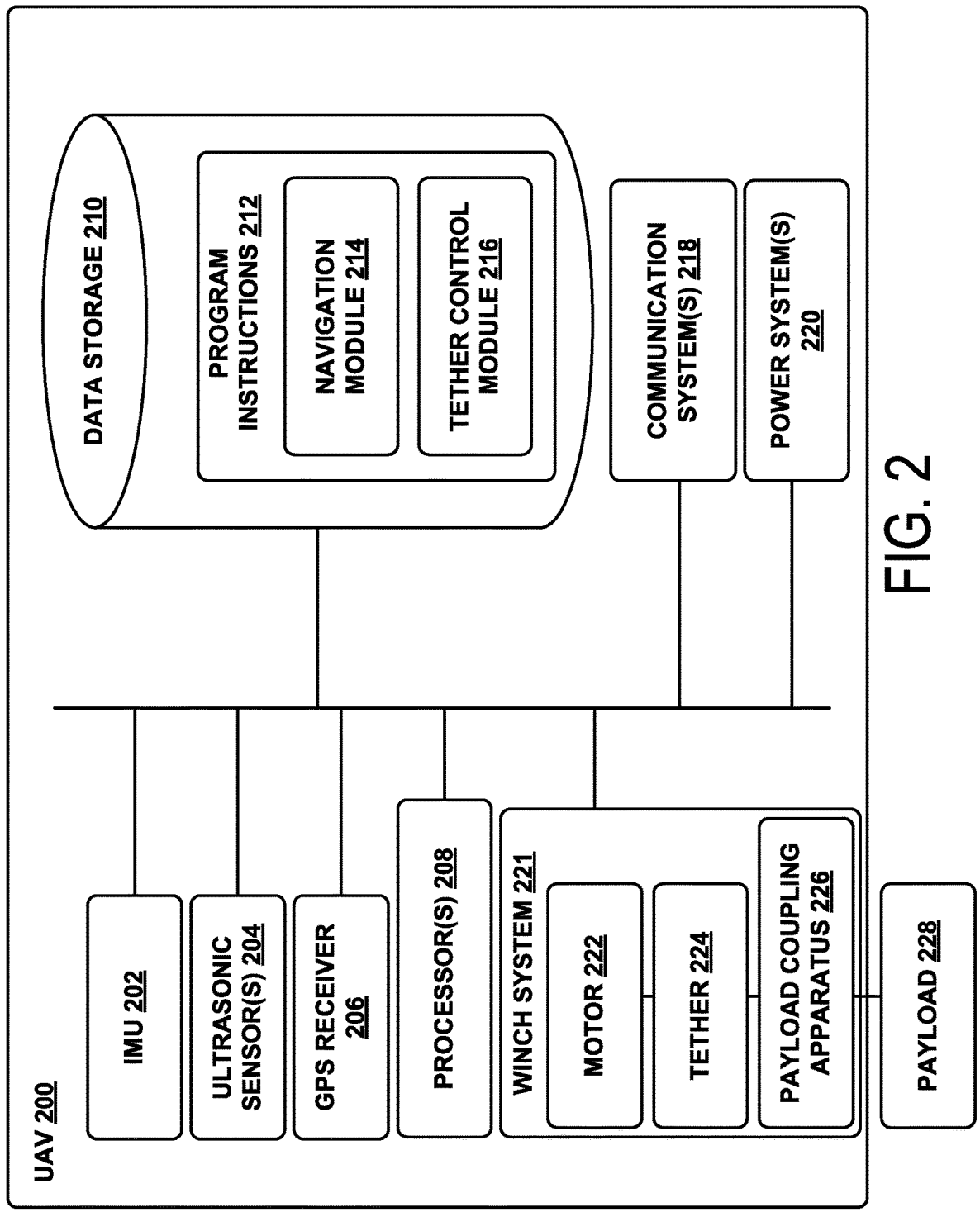
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems. In examples, UAV 200 can include a laser rangefinder (not depicted) as well. Other configurations of UAV 200 are possible.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
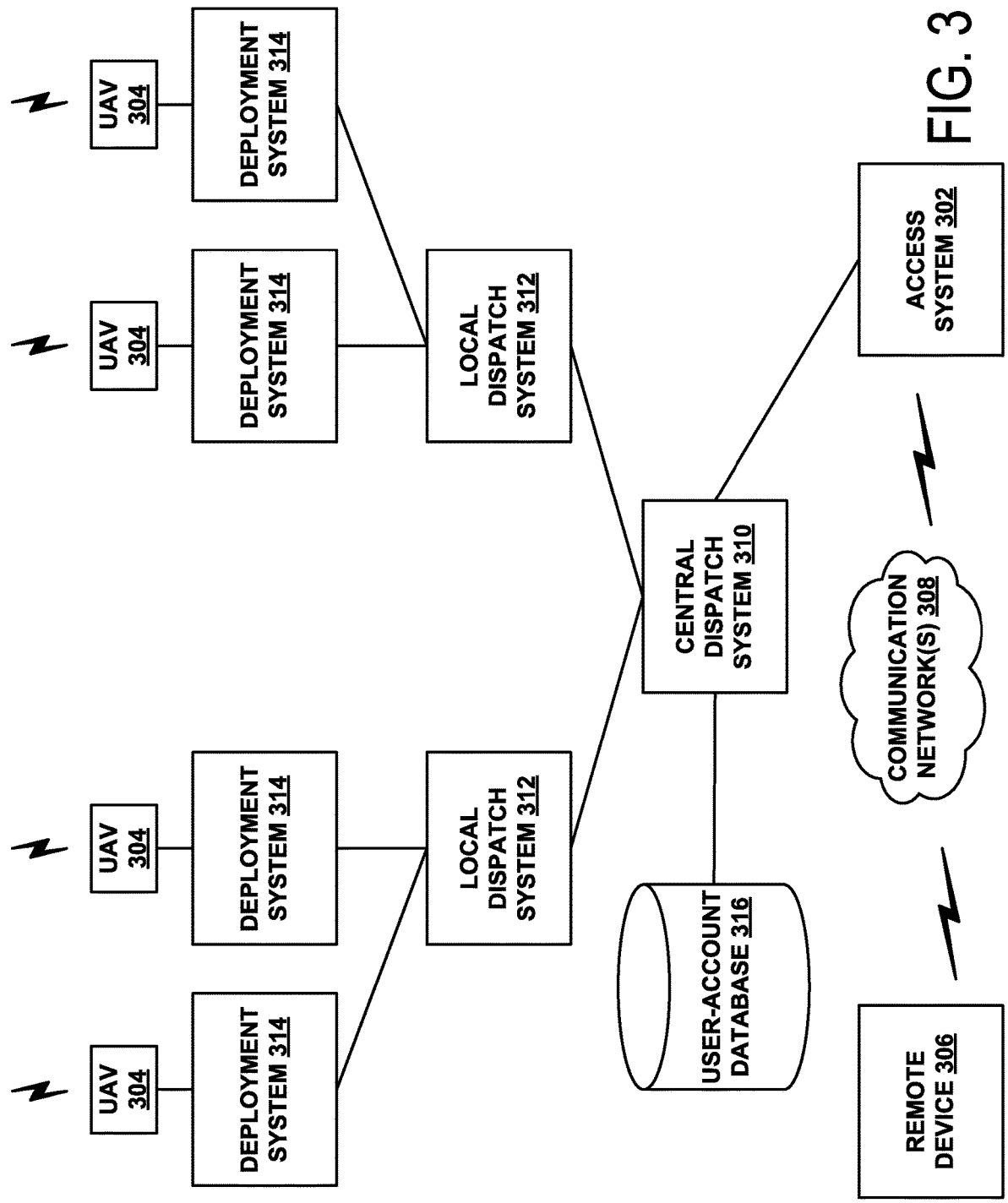
FIG. 3 is a simplified block diagram illustrating a UAV system, according to an example.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example Systems and Methods for Performing Pre-Flight Checks of UAVS

Figure 4:
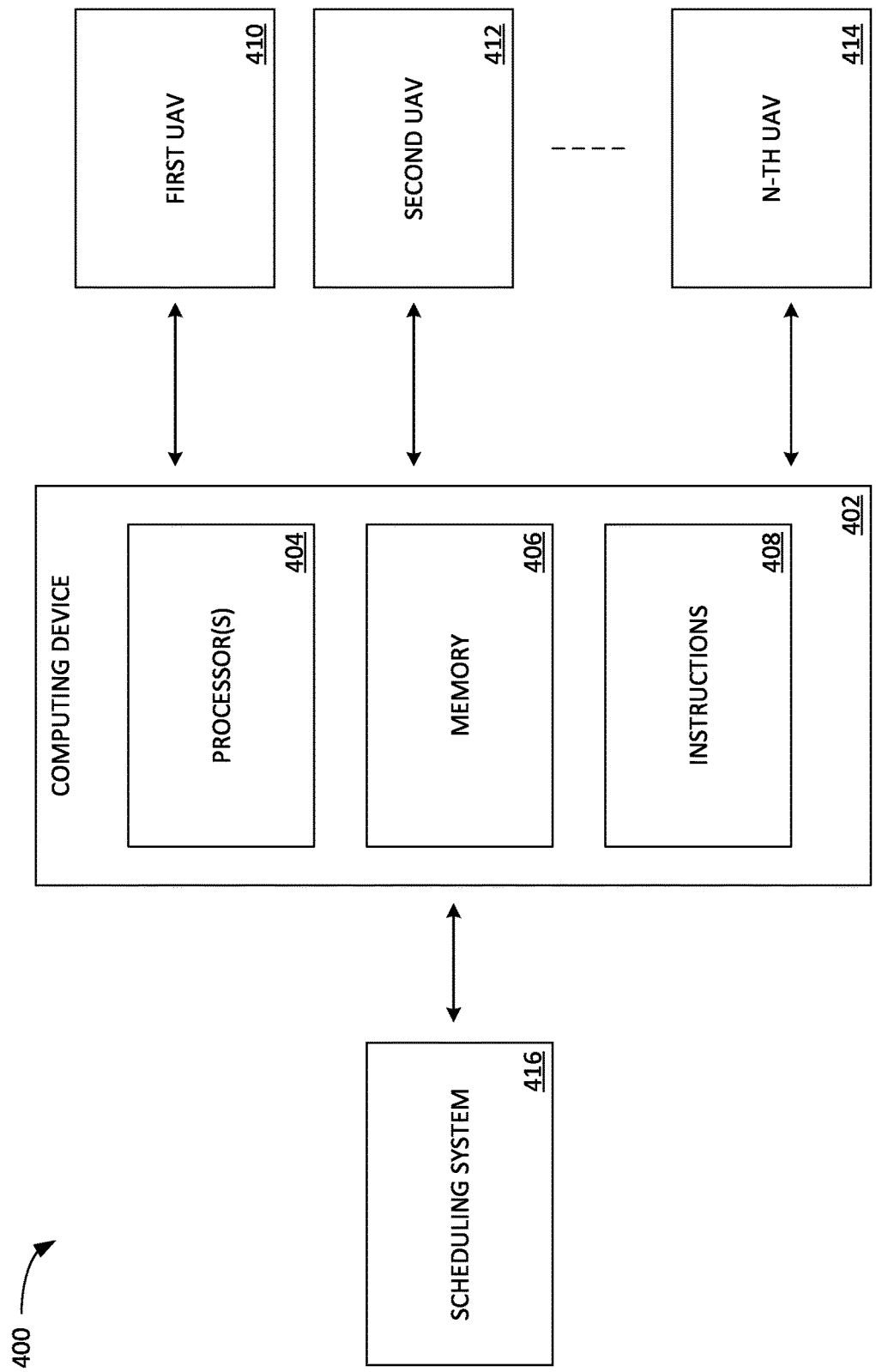
FIG. 4 illustrates a block diagram of a system, in accordance with example embodiments.

FIG. 4 illustrates a block diagram of a system, in accordance with example embodiments. In particular, FIG. 4 shows a system 400. System 400 includes a computing device 402 that serves as a controller of a fleet of UAVs including a first UAV 410, a second UAV 412, and an n-th UAV 414. The fleet of UAVs may include several additional UAVs that are collectively used to perform flight operations, such as delivering payloads.

Computing device 402 includes processor(s) 404, a memory 406, and instructions 408 stored in memory 406 and executable by processor(s) 404 to perform functions.

Processor(s) 404 may include a general-purpose processor or a special purpose processor (e.g., digital signal processors, application specific integrated circuits, etc.).

The one or more processors 404 can be configured to execute computer-readable program instructions that are stored in memory 406 and are executable to functions described herein. Memory 406 may include or take the form of one or more computer-readable storage media that can be read or accessed by at least one processor of processor(s) 404. The one or more computer-readable storage media can include volatile and/or non-volatile storage components, such as optical, magnetic, organic or other memory or disc storage, which can be integrated in whole or in part with at least one of processor(s) 404. In some embodiments, the memory 406 can be implemented using a single physical device (e.g., one optical, magnetic, organic or other memory or disc storage unit), while in other embodiments, the memory 406 can be implemented using two or more physical devices.

Memory 406 can include instructions 408, such as computer-readable program instructions, and perhaps additional data, such as a schedule of flight operations for performance be one or more UAVs, stored records of pre-flight checks of UAVs, instructions for performing pre-flight checks, expected sensor data for use when performing pre-flight checks, scheduled maintenance of UAVs, or other data related to the functions described herein. As such, memory 406 may include instructions 408 to perform or facilitate some or all of the functionality described herein with respect to system 400.

System 400 further includes a scheduling system 416. The scheduling system 416 may include a computing device configured similarly to computing device 402. Scheduling system 416 may communicate with or be a part of a backend system responsible for receiving requests for executed tasks and systematically assigning the tasks across a plurality of locations. For example, scheduling system may determine a set of flight operations for a hub of UAVs to perform in a given timeframe, and may communicate these assigned flight operations to the computing device 402. In other examples, scheduling system 416 may be integrated with computing device 402.

Within examples, computing device 402 or scheduling system 416 schedule pre-flight checks for individual UAVs in the fleet, and may additionally schedule maintenance for UAVs based on evaluating the performance of the UAV using the pre-flight check.

Each UAV may include one or more processors configured similarly to processor(s) 404, and a memory configured similarly to memory 406. Further, each UAV may include instructions stored on the memory that are executable by the one or more processors to perform one or more functions described herein, or to interact with computing device 402 to perform these functions. For example, each UAV may be configured to automatically perform a pre-flight check and evaluate its own performance during the pre-flight check, or may send results of the pre-flight check to computing device 402 for evaluation.

Figure 5:
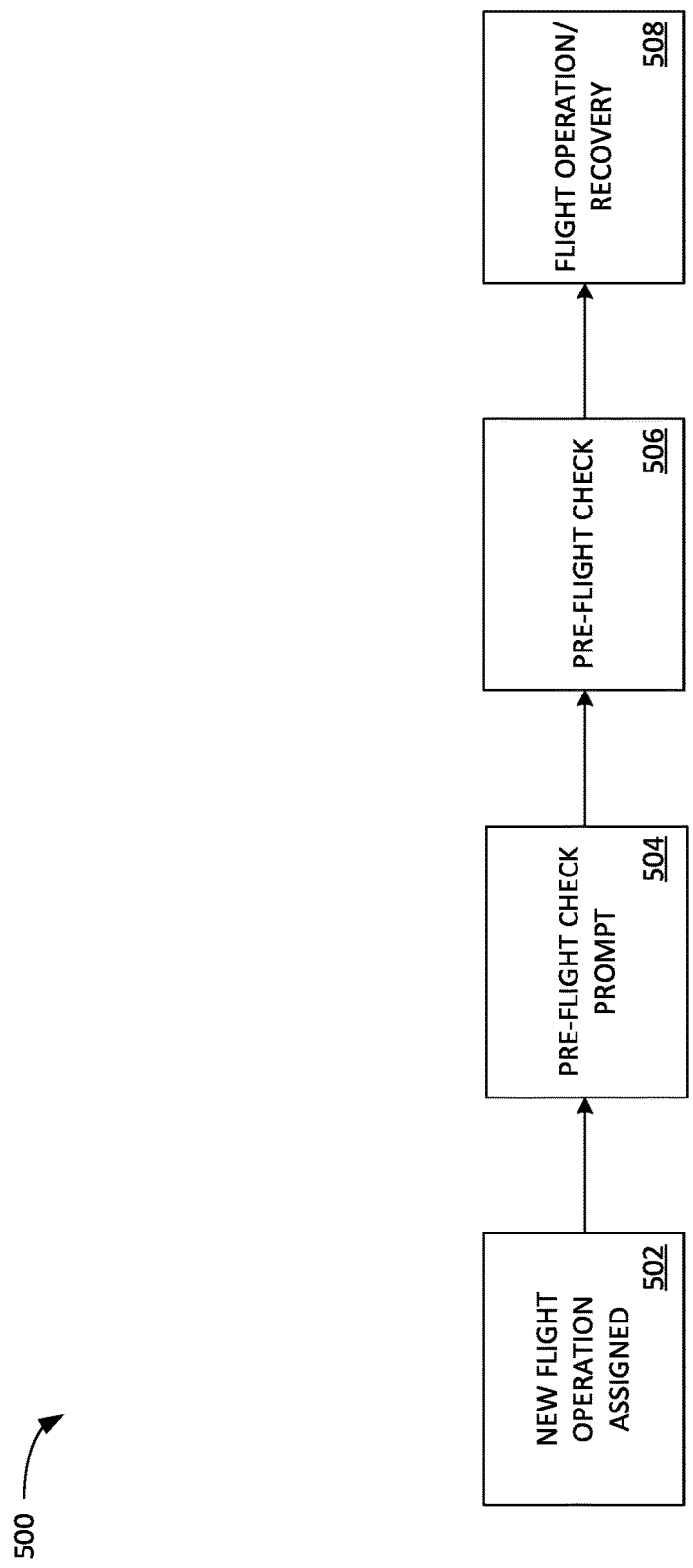
FIG. 5 illustrates a flow chart of a method, in accordance with example embodiments.

FIG. 5 illustrates a flow chart of a method, in accordance with example embodiments. In particular, FIG. 5 shows a method 500 implemented in accordance with system 400.

At block 502, method 500 includes determining that a new flight operation has been assigned to a given UAV. The flight operation may include a payload delivery, and may include information relating to a location of the payload, a destination location, and a scheduled delivery time.

At block 504, method 500 includes determining a pre-flight check prompt for a UAV. For example, the pre-flight check prompt might relate to one or more operational thresholds of the UAV or system 400. These operational thresholds may include a threshold time since a last flight operation of a UAV or a threshold difference in environmental conditions (e.g., temperature, moisture, or wind speeds) since a most recent flight operation of the UAV. Other pre-flight check prompts may include whether the system determines that a previous flight operation has evidence of potential issues with one or more components of the UAV, determines poor flight performance of the UAV, or determines that maintenance is scheduled for the UAV or has been performed on the UAV prior to the new flight operation.

At block 506, method 500 includes performing a pre-flight check on the UAV. The pre-flight check may be conducted by a controller of the UAV, the UAV, or a combination of the controller and the UAV. Part of the pre-flight check includes evaluating performance of the UAV based on flight responses of the UAV while performing a relatively short flight operation, such as hovering the UAV above a takeoff location. During the pre-flight check, the UAV may move one or more controllable components of the UAV in a predetermined sequence. For example, this may include actuation of cruise motors, hover motors, and aero control surfaces (e.g., ailerons, elevators, and rudders) in sequence.

The pre-flight check may be altered based on a context of the pre-flight check. For example, if a particular component has undergone maintenance, the pre-flight check may use a focused sequence of movements that test how well the component performs. For example, if an aileron is replaced, the sequence of movements may focus on moving the aileron and tracking flight responses of the aerial vehicle in response to moving the aileron. As another example, in a pre-flight check associated with windy conditions, the UAV may hover at an altitude conducive to testing wind conditions and flight responses to the wind conditions. For example, this altitude may be greater than that of a general pre-flight check. Further details with respect to the pre-flight check are provided below with respect to FIGS. 6A-6D and FIG. 9.

At block 508, method 500 includes causing the UAV to perform the flight operation, or initiating recovery of the UAV by causing the UAV to land. In some examples, the UAV may reach this determination independently and automatically perform the flight operation in response to its own evaluation of performance during the pre-flight check. In other examples, the UAV may relay sensor data to the controller, and the controller may evaluate performance of the UAV before sending a control instruction to the UAV to perform the flight operation or to land. In some examples, the pre-flight check is performed independently from the UAV being assigned to a new flight operation. Further details regarding evaluating performance of the UAV are provided below with respect to FIGS. 6B, 6C, and 10.

Figure 6A:
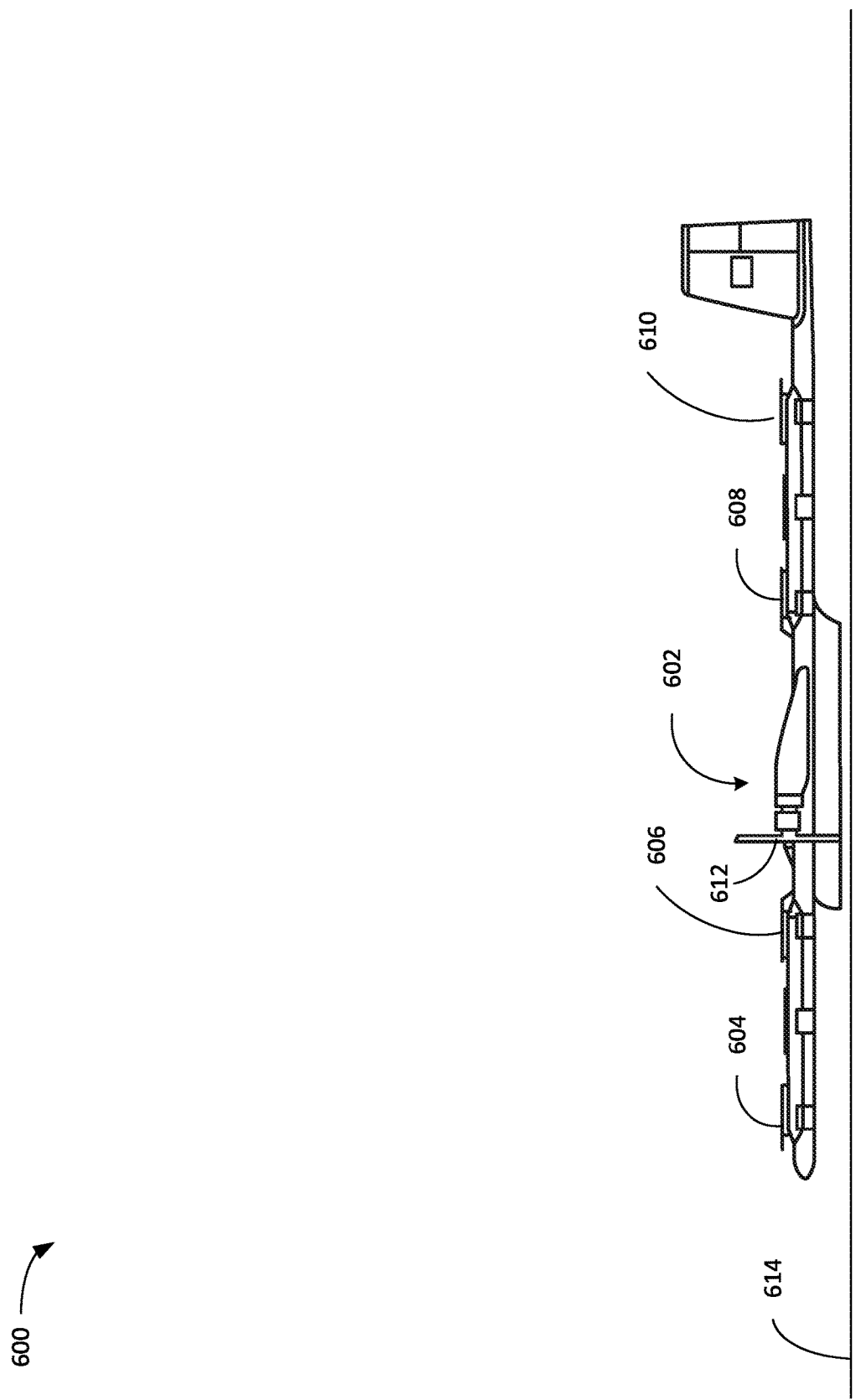
FIG. 6A illustrates a system in a first state, in accordance with example embodiments.

FIG. 6A illustrates a system in a first state, in accordance with example embodiments. In particular FIG. 6A shows a system 600 that includes a UAV 602 having rotors 604, 606, 608, and 610, and propeller 612. In an example scenario of the first state, the UAV is idle at a takeoff location 614 and is waiting for a prompt to perform a flight operation or to perform a pre-flight check.

Within examples, UAV 602 may perform a preliminary check of one or more components to ensure that any components necessary to hover the UAV 602 are operating effectively. For example, the UAV may cycle through rotors 604, 606, 608, and 610 and detect slight movements in the UAV to determine whether they are generating enough thrust to operate effectively. The UAV may include an IMU or accelerometer that detects movements or vibrations associated with each rotor being actuated, and the UAV or a controller can compare this data to expected data to determine that each rotor is generating a threshold level of thrust. Accordingly, in an alternative example scenario of the first state, the UAV is performing a preliminary check prior to the pre-flight check that confirms the integrity of the rotors used for hovering the UAV and corresponding mounts on UAV 602.

In some examples, a UAV is transported to a location manually or by another device. For example, this may occur after maintenance of the UAV or if the fleet of UAVs is reorganized between a plurality of UAV hubs. Accordingly in the scenario depicted in FIG. 6A, the precise location of the UAV is not confirmed, and the UAV begins the pre-flight check without a pre-determined location. In these scenarios, the pre-flight check allows the UAV to determine its location prior to performing the flight operation.

Figure 6B:
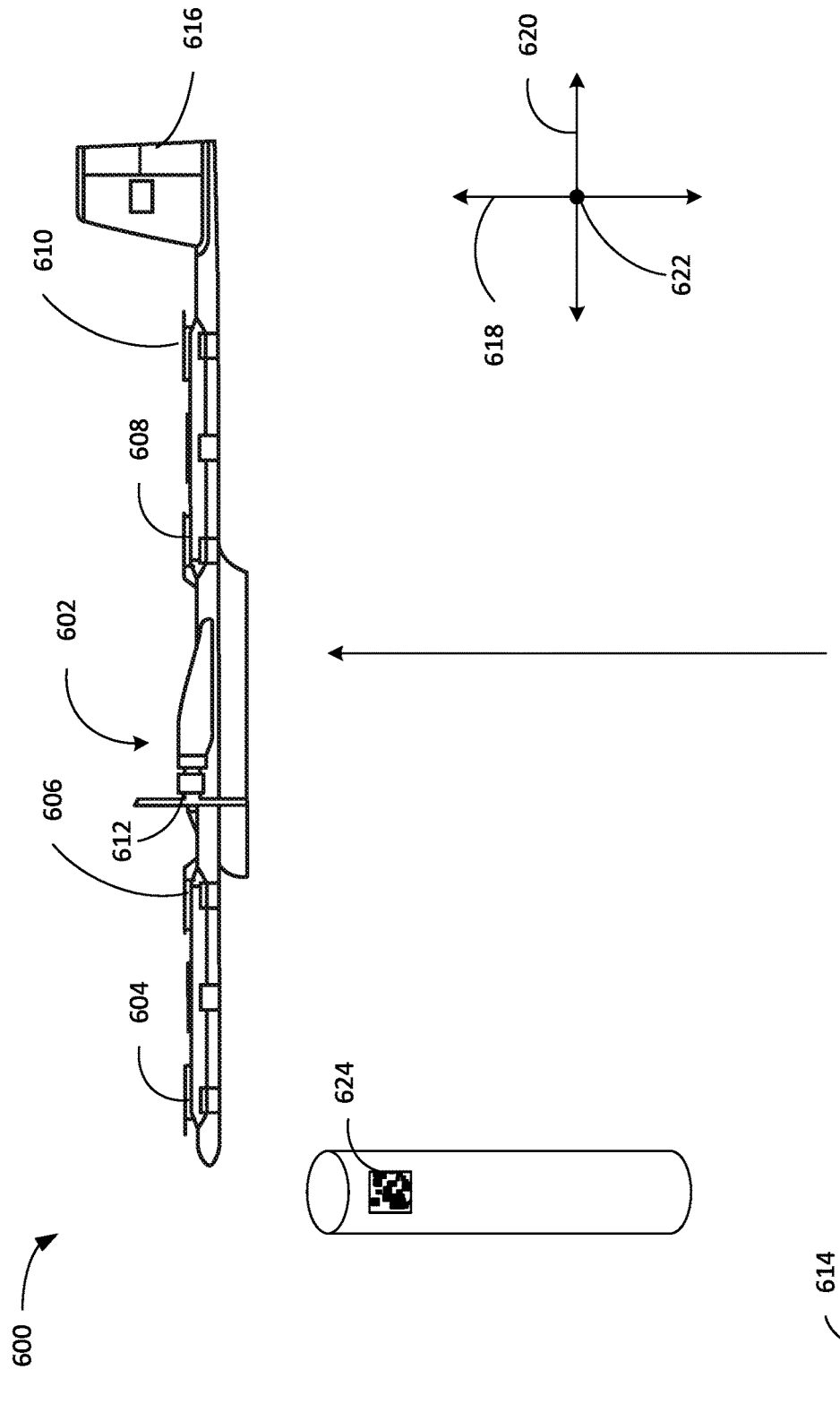
FIG. 6B illustrates a system in a second state, in accordance with example embodiments.
Figure 6C:
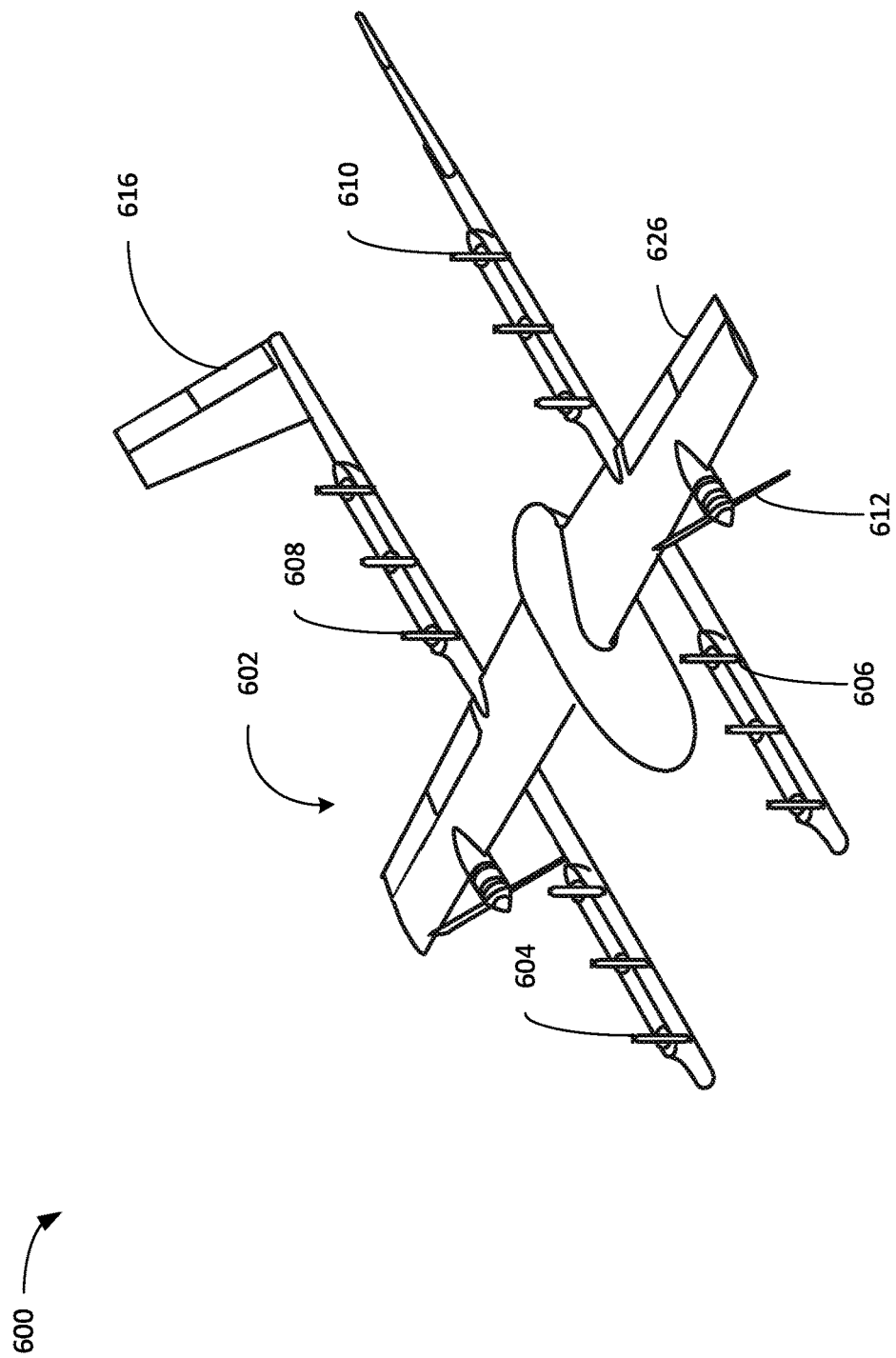
FIG. 6C illustrates perspective view of the system in the second state, in accordance with example embodiments.

FIG. 6B illustrates a system in a second state, in accordance with example embodiments. In particular, FIG. 6B shows UAV 602 hovering above takeoff location 614. While hovering, UAV 602 moves a plurality of controllable components, including rotors 604, 606, 608, and 610, propeller 612, and rudder 616. As shown in FIG. 6C, other controllable components can be moved as well. The UAV controls these components individually and in sequence while other components maintain a stable orientation of the UAV. For example, a bottom side of the UAV may be continually oriented facing takeoff location 614, or more generally may align with a ground surface.

While different components are being actuated for the pre-flight check, the UAV may have a flight response that corrects for forces generated by actuating the components. For example, when rudder 616 is moved while hovering UAV 602, UAV may tend to rotate along a yaw axis 618, but other components, such as the rotors and another rudder may respond to negate this effect. Sensor data, such as IMU data, may detect an extent to which the UAV rotates in response to moving rudder 616, and the sensor data may also indicate information such as a power level provided to each rotor and a position of other rudders, ailerons, elevators, or other components while the UAV engages in a flight response to moving rudder 616. Other examples involving moving ailerons and tracking rotation along a roll axis 620 or moving elevators and tracking rotation along a pitch axis 622 can be part of the pre-flight check. Accordingly, acceleration, velocity, and position data can be used to evaluate performance of UAV 602.

The flight response of the UAV 602 may indicate whether the controlled component (e.g., rudder 616) is operating appropriately. For example, if expected sensor data from the IMU indicates that more rotation should have occurred before the flight response of UAV 602, this may indicate that rudder 616 is generating less torque along yaw axis 618 that is expected, and this indicates that rudder 616 or a mount of rudder 616 on UAV 602 may be damaged. In other contexts, the flight response may indicate that another part of UAV is operating unexpectedly. For example, position data of another rudder may indicate that the other rudder, an aileron, or an elevator did not move as much as expected during the flight response, and this may indicate that this component is not operating as expected or that a control system of UAV 602 in not operating as expected. In any of these scenarios, determining a potential issue with performance of the UAV may include comparing the sensor data to expected sensor data, and determining that the sensor data differs from the expected data by a threshold amount. For example, if the difference is greater than the threshold, then the UAV may be grounded and further analyzed or tagged for maintenance.

Within examples, other aspects of UAV 602 are simultaneously analyzed during the pre-flight check. For example, levels of vibration in the UAV can be analyzed to evaluate connections in the UAV. For example, increased vibration relative to an expected vibration level may indicate debonded joints. Hardware integrity may also be analyzed using vibration. For example, increased vibration relative to the expected vibration level may indicate one or more or chipped propellers or rotors. As another example, a power system of UAV 602 can be analyzed to ensure batteries are properly warmed (e.g., by detecting a temperature of the batteries) to allow full energy draw capability, and indicating that circuits in UAV 602 are operating as intended. In still further examples, a location of UAV 602 can be confirmed during the pre-flight check by identifying a fiducial marker 624 or other visual features of the environment associated with a known location. For example the camera may match aspects of the captured image to one or more features of a known map to derive the location of the UAV.

As described above, the pre-flight check may include a particular sequence of movements to systematically review each relevant component in UAV 602, and allow for consistent sensor data for use when comparing to the expected sensor data. In some examples, the sequence of movements can be controlled to gradually alter an output of different components and thereby determine thresholds at which UAV 602 or a component thereof performs differently than expected. For example, one or more rotors may be controlled to add a force-induced vibration to UAV 602, and the magnitude and frequency of the vibration can be changed to determine a range of conditions that UAV 602 might experience during a flight operation. Further description of these implementation are provided below with respect to FIG. 7.

The UAV may automatically perform the pre-flight check and corresponding evaluation, and may remove itself from a list of UAVs designated for future flight operations. For example, the UAV may communicate with a controller or with a backend system (e.g., scheduling system 416) to indicate that UAV 602 should be analyzed or receive maintenance. In some examples, the UAV may automatically detect a particular component that is not performing correctly, and may indicate that the component requires replacement or maintenance of the controller.

FIG. 6C illustrates perspective view of the system 600 in the second state, in accordance with example embodiments. As shown in FIG. 6C, UAV 602 additionally includes an aileron 626. This and other components of UAV 602 may move in a sequence of movements in order to drive flight responses of UAV 602.

Figure 6D:
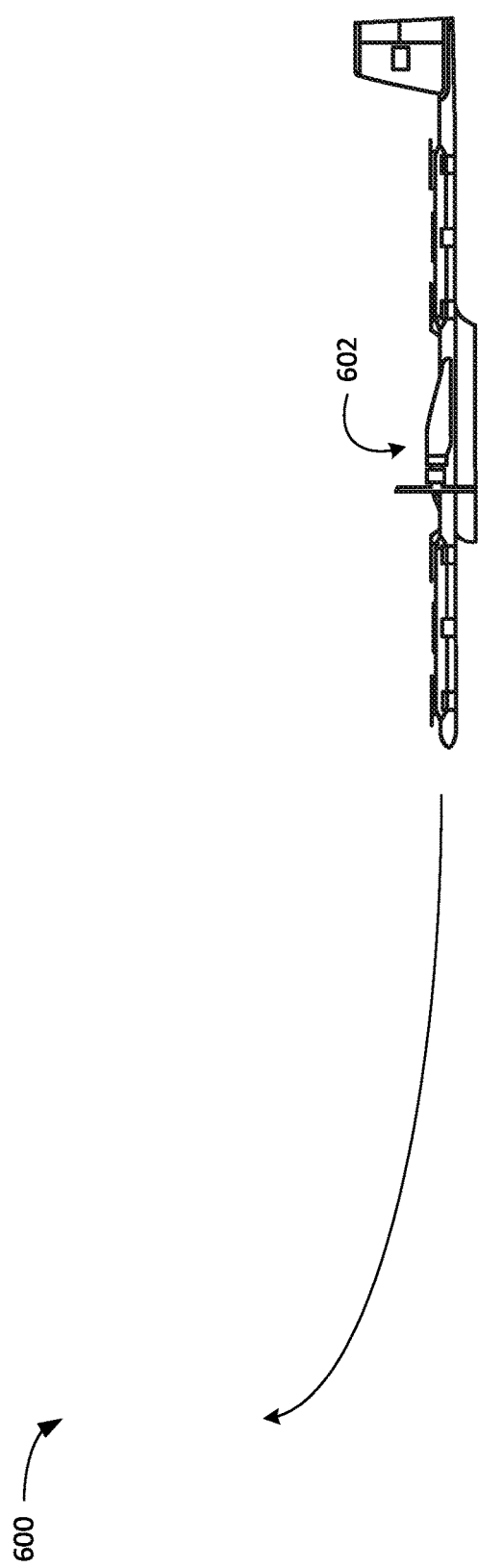
FIG. 6D illustrates a system in a third state, in accordance with example embodiments.

FIG. 6D illustrates a system in a third state, in accordance with example embodiments. In particular, FIG. 6D shows UAV 602 proceeding to perform a flight operation after performing the pre-flight check. In some contexts, a pre-flight check may be performed periodically in order to ensure that UAV 602 is ready for a flight operation. In other examples, the pre-flight check may be performed directly before performing the flight operation in order to provide up-to-date information prior to performing the flight operation.

Figure 7:
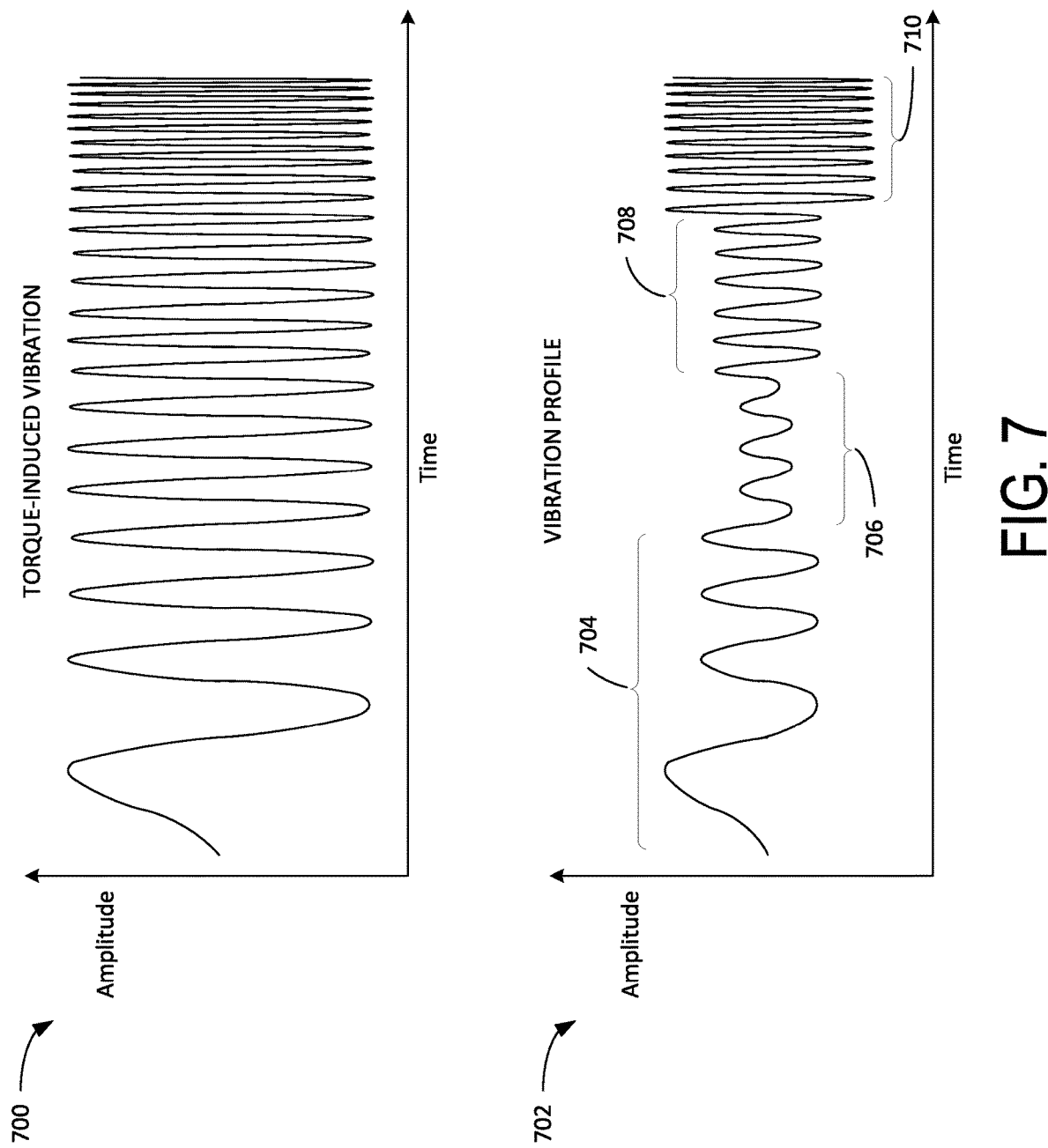
FIG. 7 illustrates a force-induced vibration and a vibration profile of a UAV, in accordance with example embodiments.

FIG. 7 illustrates a force-induced vibration and a vibration profile of a UAV, in accordance with example embodiments. In particular, FIG. 7 shows a force-induced vibration 700 with increasing frequency in accordance with a chirp signal and a vibration profile 702 that indicates detected vibrations on a UAV in response to the force-induced vibrations. For example, one or more rotors can be actuated at different power levels to drive a torque along one or more structural members (e.g., boom arms) of the UAV, which induces a flight response of the UAV. The UAV may absorb some frequencies of the force-induced vibration 700 differently than others. For example, a first range of frequencies 704, a second range of frequencies 706, a third range of frequencies 708, and a fourth range of frequencies 710 may each have different amplitudes associated with different dampening. These different dampening levels may correspond to a performance level of the UAV. For example, an expected vibration profile can be compared with vibration profile 702 to determine whether the UAV is performing normally, or if maintenance may be required. As used herein, a "force-induced vibration" refers to vibration of one or more structural components of the UAV (e.g., boom arms, wings, or a fuselage of the UAV) resulting from a torque applied to the one or more structural components (e.g., from a rotor). As used herein, the term "vibration profile" refers to a collection of vibration data (e.g., determined based on sensor data from an IMU) that indicates how much one or more structural components of the UAV vibrate over time and/or over a range of vibration frequencies.

Determining an expected vibration profile may be performed by averaging vibration profiles from a plurality of UAVs determined to be performing normally. In other examples, a machine learning model can be trained with sensor data from a plurality of UAVs in order to determine whether vibration profile 702 indicates that one or more components of the UAV requires maintenance. Other ways of evaluating vibration profiles are possible.

Within examples, a vibration profile of the UAV during a flight operation may be used to determine whether a UAV should perform a pre-flight check. Further details regarding using in-flight sensor data to determine whether to perform a pre-flight check are described below with respect to FIG. 9.

Figure 8:
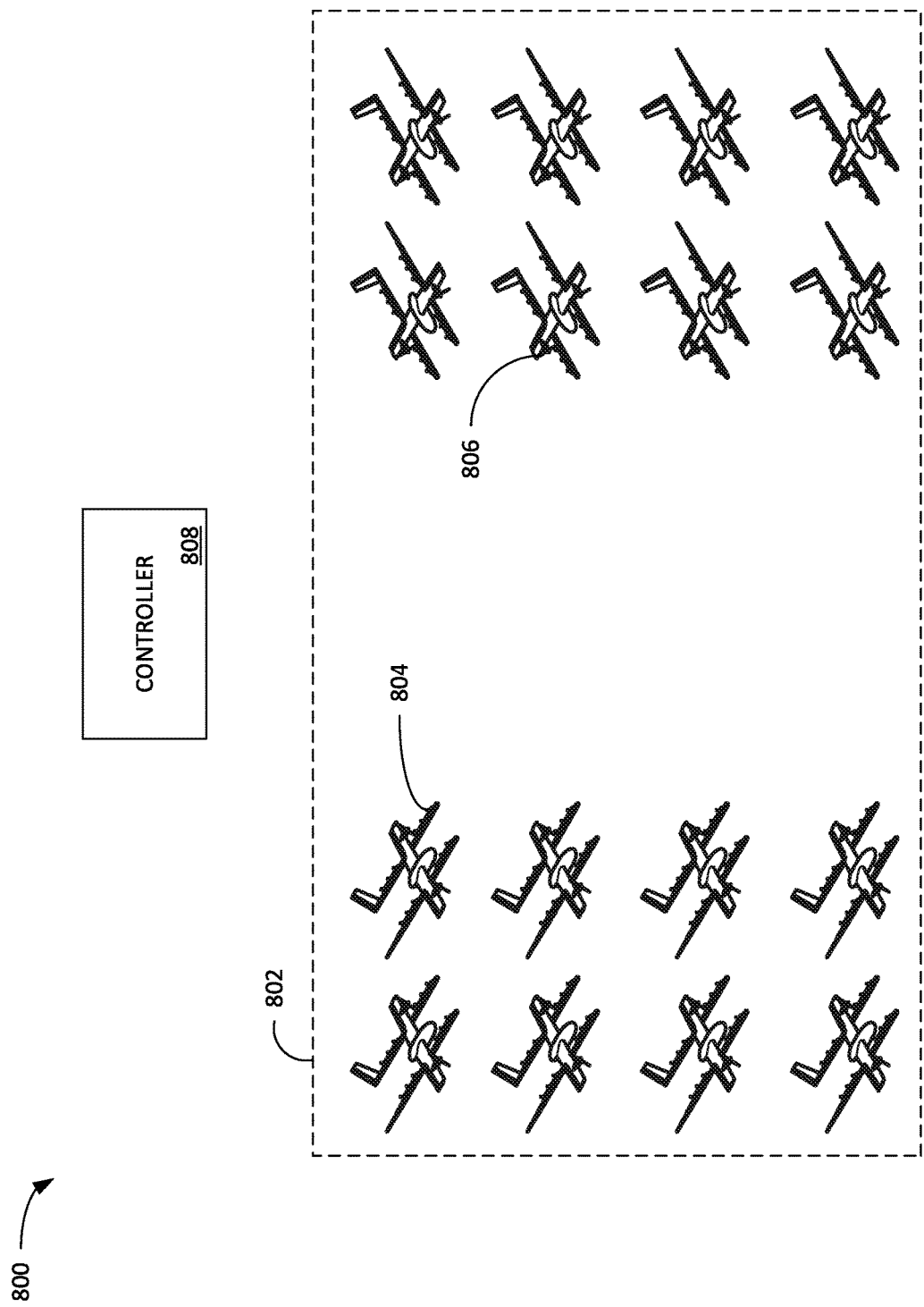
FIG. 8 illustrates a system, in accordance with example embodiments.

FIG. 8 illustrates a system, in accordance with example embodiments. In particular, FIG. 8 shows a system 800 that includes a fleet 802 of UAVs and controller and a controller 808. Controller 808 can be configured similarly to computing device 402.

Controller 808 may interface with a scheduling system to assign flight operations for each UAV in fleet 802, and may also instruct the UAVs to perform pre-flight checks in accordance with a set of prompts. As UAVs arrive at a landing location, controller 808 may update records associated with each UAV, and may save sensor data obtained by the UAV. By tracking usage of each UAV and sensor data from flight operations of each UAV, controller 808 can facilitate periodic pre-flight checks that do not interfere with flight operation schedules.

In some examples, different UAVs in fleet 802 may be treated differently in pre-flight checks. For example, a first UAV 804 may have more or less usage than a second UAV 806, or may be a different model of UAV that is suited for different types of flight operations. A UAV having more usage, older components, or having been maintained less recently may be subject to pre-flight checks more regularly than a less used, newer, or more recently maintained UAV. Further, different types of pre-flight checks may be implemented for different models of UAVs in order to more accurately evaluate performance of the UAV.

Figure 9:
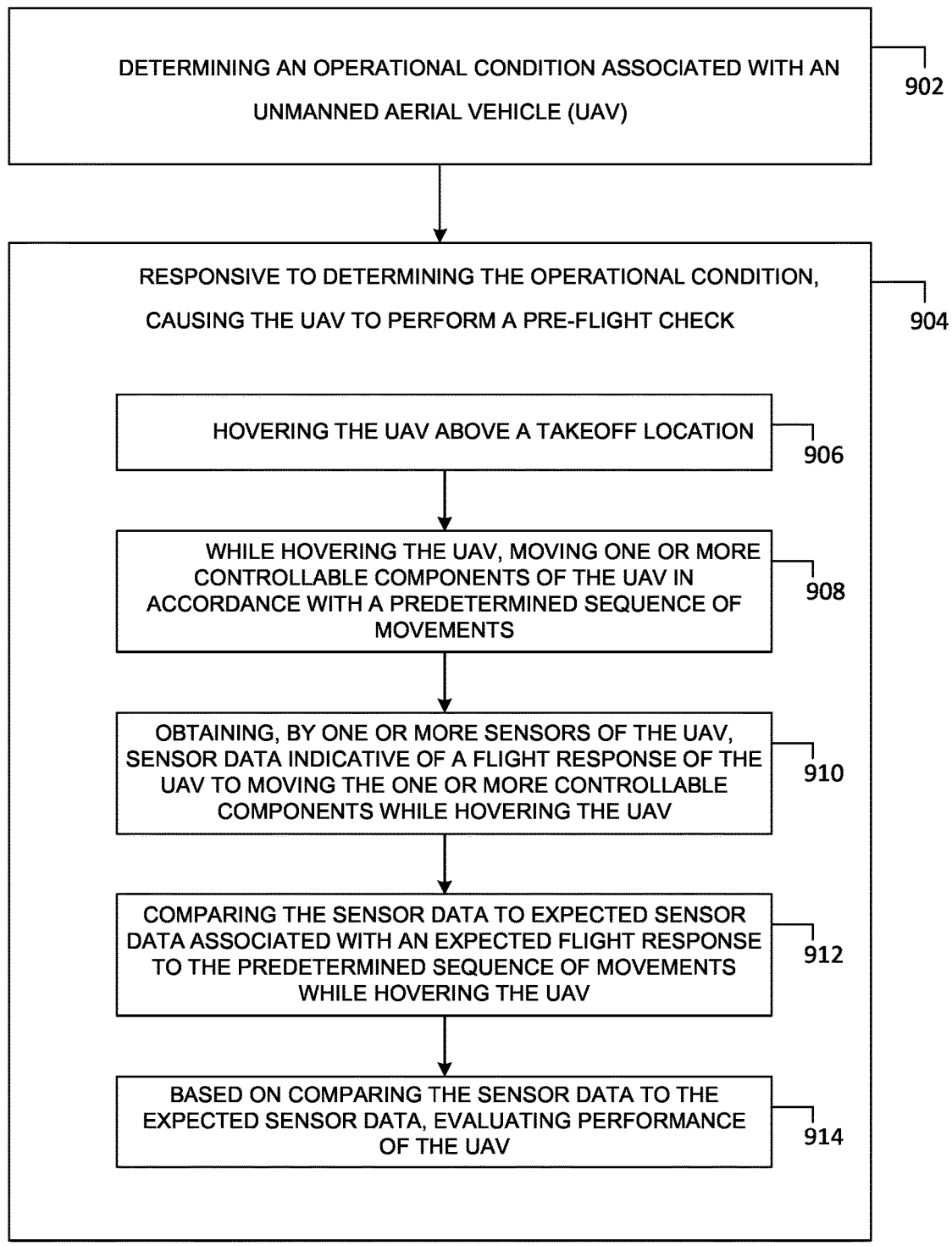
FIG. 9 illustrates a block diagram of a method, in accordance with example embodiments.

FIG. 9 illustrates a block diagram of a method, in accordance with example embodiments. In particular, FIG. 9 shows a method 900. Method 900 may be carried out by any of the systems, devices, components, or combinations thereof described above with respect to FIGS. 1-8.

In addition, for the method shown in FIG. 9 and other processes and methods disclosed herein, the flowchart shows functionality and operation of one possible implementation of present embodiments. In this regard, some blocks may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 9 may represent circuitry that is wired to perform the specific logical functions in the process.

At block 902, method 900 includes determining an operational condition associated with an unmanned aerial vehicle (UAV). For example, determining the operational condition may involve determining aspects of maintenance or usage of the UAV, such as how recently the UAV was maintained or how many flight operations the UAV has conducted within a given timeframe (e.g., since a most recent pre-flight check). In another example, determining the operational condition may involve determining an in-flight performance of the UAV, such as an actual time to complete a flight operation relative to an expected time to complete the flight operation. In another example, determining the operational condition may involve determining an environmental condition, such as a temperature, humidity level, or wind speed in the environment. Other types of operational conditions can be determined as well. Within examples, a controller of the UAV may determine the operational condition. In other examples, a UAV may automatically determine the operational condition.

At block 904, method 900 includes, responsive to determining the operational condition, causing the UAV to perform a pre-flight check. The pre-flight check can include several different tests to determine a performance level of the UAV. In some examples, the pre-flight check involves one or more targeted tests depending on which operational condition is detected. For example, a general pre-flight check associated with a threshold time between pre-flight checks being detected may include several checks, while a pre-flight check associated with an increased wind speed relative to a past flight operation may focus on performance of rotors and aero surfaces in a windy condition.

Blocks 906-914 are performed in accordance with block 904. In particular, blocks 906-914 relate to performing a pre-flight check for a UAV. Within examples, a controller (e.g., computing device 402), the UAV, or a combination of the controller and the UAV may perform aspects of blocks 906-914.

At block 906, method 900 includes hovering the UAV above a takeoff location. For example, this may be performed as described above with respect to FIGS. 6B and 6C.

At block 908, method 900 includes, while hovering the UAV, moving one or more controllable components of the UAV in accordance with a predetermined sequence of movements. For example, different rotors, ailerons, elevators, rudders, servos, actuators, or other movable components of the UAV may be moved in turn over time in order to evaluate performance of the UAV at each stage of the sequence. In this manner, the pre-flight check can be used to identify a specific aspect of the UAV that might require further analysis or maintenance. Within examples, the controller may include or communicate with a database of pre-flight check movements for the UAV to check. In this manner, the system may adapt the pre-flight check under different circumstances, or may ensure that each UAV performs the same checks, even if the sequence is adjusted.

At block 910, method 900 includes obtaining, by one or more sensors of the UAV, sensor data indicative of a flight response of the UAV to moving the one or more controllable components while hovering the UAV. For example, an IMU, accelerometer or other sensors that indicate an orientation of the UAV, forces imparted by the UAV (e.g., thrust of a given rotor and corresponding torque on the UAV), or forces experienced by the UAV (e.g., drag) can be used to obtain the sensor data. This sensor data may indicate how the UAV initiates a flight response based on forces resulting from the sequence of movements.

At block 912, method 900 includes comparing the sensor data to expected sensor data associated with an expected flight response to the predetermined sequence of movements while hovering the UAV.

At block 914, method 900 includes, based on comparing the sensor data to the expected sensor data, evaluating performance of the UAV. For example, a difference between the sensor data and the expected sensor data can be determined, and the difference can be compared to one or more thresholds to determine whether the UAV has a normal flight response to each movement in the sequence of movements. If the difference exceeds a threshold, then the UAV may be designated for further analysis or maintenance. In some examples, a total performance score can be calculated based on differences between the sensor data and the expected data. If the score exceeds a normalized score threshold (e.g., above 0.9 out of a 1.0 max normalized score) the UAV may be permitted to perform the flight operation and otherwise may be designated for further analysis or maintenance.

Within examples, evaluating performance of the UAV can include evaluating particular components of the UAV. For example, the sensor data can indicate faults, failures, or breaks in actuators or other moveable components of the UAV, inaccurate or broken sensors (e.g., sensors that consistently provide data that differs from the expected data, or that do not provide sufficient data), or failing structural components of the UAV (e.g., a broken boom arm or wing). Actuator-specific, sensor-specific, or structural component-specific checks can be implemented as part of the pre-flight check. For example, sensor specific checks can include GPS module checks (comparing a number of tracked satellites and a total number of trackable satellites at a given time), camera checks (determining whether a camera is accurately detecting motion, fiducials, or a landing pad), depth sensor checks (determining whether the system can detect obstacles or the ground surface using sensor data from one or more depth sensors).

Within examples, method 900 further includes, based on evaluating performance of the UAV, causing the UAV to perform a flight operation. In some examples, the UAV may self-evaluate, and determine whether to perform a flight operation, or whether it should be designated for further maintenance. In other examples, the UAV may transmit the sensor data to the controller, and the controller may evaluate the UAV. In some examples a type of flight operation can be designated for the UAV based on evaluating the performance of the UAV. For example, if the performance is less than nominal (e.g., has a performance rating below a first threshold score) but still suitable for some tasks (e.g., the rating is above a second threshold score), the UAV can be assigned less difficult tasks (e.g., flight operations within a threshold flight radius), while other UAVs in the fleet can be assigned to more difficult tasks (e.g., flight operations outside of the threshold flight radius). In some examples, this evaluation and designation can be performed independently by the UAV. In other examples, a controller may store performance ratings for each UAV based on pre-flight checks and/or based on sensor data from flight logs of the UAVs, and can assign tasks for each UAV accordingly. In these examples, a performance rating may be based on both the sensor data from flight logs of the UAV and from the pre-flight check.

Within examples, method 900 includes, based on evaluating performance of the UAV, causing the UAV to return to the takeoff location and scheduling maintenance of the UAV.

Within examples, the pre-flight check further includes maintaining at least one of a position or an orientation of the UAV along at least one axis while moving the one or more controllable components, and the expected data includes values corresponding to a stable orientation of the UAV while hovering. For example, the one or more controllable components may include one or more of an aileron, an elevator, or a rudder, and the sensor data may include torque data indicative of torque applied by one or more rotors of the UAV on a roll axis, a pitch axis, and a yaw axis when maintaining the orientation of the UAV. In these examples, comparing the sensor data to the expected sensor data includes comparing the torque data to an expected roll torque when moving the aileron, comparing the torque data to an expected pitch torque when moving the elevator, and comparing the torque data to an expected yaw torque when moving the rudder.

Within examples, determining the operational condition associated with the UAV includes detecting an environmental condition associated with flight performance of the UAV, and causing the UAV to perform the pre-flight check includes causing the UAV to perform the pre-flight check responsive to detecting the environmental condition. For example, detecting the environmental condition may include detecting a wind speed that is greater than or equal to a threshold wind speed. Within examples, detecting the environmental condition may include detecting a change in one or more of moisture level, temperature, or wind speed since a most recent flight operation of the UAV. In this manner, the system can reevaluate the UAV in changing conditions.

Within examples, determining the operational condition includes determining that an inactive period since a most recent flight operation of the UAV has exceeded a threshold time period. For example, the threshold time period may be 60 days.

Within examples, determining the operational condition includes determining that maintenance has been performed in the UAV between a most recent flight operation of the UAV and a current time. In this manner, the system can check to determine whether an issue addressed by the maintenance has improved performance of the UAV, or possibly introduced a new issue.

Within examples, determining the operational condition includes comparing one or more in-flight parameter values of the UAV from a most recent flight to expected in-flight parameter values, and determining a potential failure condition based on a difference between the one or more in-flight parameter values and the expected in-flight parameter values being greater than or equal to a threshold difference. For example, a coefficient of variation between the in-flight parameter values and the expected in-flight parameter values being greater than 1 may indicate a potential failure condition, such as a debonded joint, a chipped rotor, or an aero surface that is not moving. As another example, a vibration profile may be determined for the UAV during the most recent flight operation, and can be compared to an example vibration profile to determine whether a possible failure condition exists. In these examples, the expected in-flight parameter values may be different from the expected sensor data of the pre-flight check. For example, the expected sensor data of the pre-flight check may correspond to hovering the UAV for a relatively short period (e.g., less than a minute), while the expected in-flight data may correspond to navigating between a takeoff location and a destination for an extended period (e.g., 20 or more minutes).

Within examples, a machine learning model can be trained using vibration profiles from a plurality of flight operations, the vibration profile can be provided as an input to the trained machine learning model, and the machine learning model may output (e.g., provide a score) indicating how normally the UAV operated compared to expectations, or may output an output corresponding to multiple different components of the UAV. For example, the machine learning model may be trained to classify different types of potential failure conditions of the UAV. In more general examples, a machine learning model can be trained using sensor data from a plurality of flight operations, and sensor data from the most recent flight operation may provided as an input to the trained machine learning model, which may output an indication of how effectively the UAV or components thereof performed during the flight operation. These machine learning examples may be implemented in accordance with block 902 to determine an operating condition (e.g., identifying a possible failure condition) of the UAV.

Within examples, the pre-flight check further includes, while hovering the UAV, identifying a visual feature (e.g., a placed location marker) in an environment surrounding the UAV, and confirming a location of the UAV based on identifying the visual feature. For example, the visual feature may be one of a plurality of fiducial markers placed around the takeoff location.

Within examples, moving one or more controllable components of the UAV in accordance with the predetermined sequence of movements includes rotating one or more rotors of the UAV to apply a force-induced vibration on the UAV. For example, the one or more rotors may apply forces that cause the UAV to move up and down in rapid succession, or may apply a changing amount of torque along one or more structural members of the UAV (e.g. boom arms, a wing, the fuselage, etc.). In these examples, the sensor data includes a vibration profile of the UAV in response to the force-induced vibration, and the expected sensor data comprises an expected vibration profile of the UAV in response to the force-induced vibration. In some examples, the force-induced vibration may include a changing frequency of vibrations (e.g., the chirp signal shown in FIG. 7), and the expected vibration profile may include an expected vibration profile of the UAV in response to the changing frequency of vibrations.

Within examples, the pre-flight check further includes, prior to hovering the UAV, and while the UAV is contacting a takeoff surface (e.g., a ground surface) of the takeoff location, pulsing each rotor on the UAV, obtaining movement data indicative of the UAV moving responsive to pulsing each rotor (e.g., acceleration data from an IMU), and comparing the movement data to a threshold movement level (e.g., a threshold expected acceleration of the UAV corresponding to pulsing each rotor). In these examples, hovering the UAV includes hovering the UAV responsive to determining that the movement data falls within the threshold movement level. For example, pulsing each rotor on the UAV while contacting the takeoff surface of the takeoff location may serve as a preliminary check for the UAV as described above with respect to FIG. 6A.

Within examples, one or more additional UAVs can be used to evaluate performance of the UAV during the pre-flight check. For example, a central controller can cause the additional UAVs to observe the UAV. The additional UAVs can verify that the UAV has the necessary actuators for a give flight operation, and verify the UAV's position and motion. The observations from the additional UAV's can be compared with sensor data and determinations from the UAV in order to confirm that the actuators and other movable components are operating properly and that the sensors are operating properly. This information can be used when evaluating the performance of the UAV. Within examples, causing the additional UAVs to observe the UAV can involve instructing the UAVs to takeoff and hover nearby the UAV (e.g., within a threshold distance of the UAV) while the UAV performs the pre-flight check.

Other functionality described above with respect to FIGS. 1-8 can be included within method 900 as well.

VI. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   hovering an unmanned aerial vehicle (UAV) in an environment;
   while hovering the UAV, (i) moving first one or more controllable components of the UAV in accordance with a predetermined sequence of movements to apply a force to the UAV and (ii), in response to moving the first one or more controllable components, moving second one or more controllable components of the UAV to attempt to maintain at least one of a position or an orientation of the UAV along at least one axis by correcting for the force applied to the UAV by moving the first one or more controllable components;
   obtaining, by one or more sensors of the UAV, sensor data indicative of a flight response of the UAV caused by moving the second one or more controllable components while hovering the UAV;
   comparing the sensor data to expected sensor data associated with an expected flight response to the predetermined sequence of movements; and
   based on comparing the sensor data to the expected sensor data, evaluating performance of the UAV.

2. The method of claim 1, further comprising:
   moving third one or more controllable components of the UAV to apply a force-induced vibration to the UAV, wherein the sensor data is further indicative of a vibration profile of the UAV in response to the force-induced vibration, and wherein the expected sensor data comprises an expected vibration profile of the UAV in response to the force-induced vibration.

3. The method of claim 2, wherein moving third one or more controllable components of the UAV to apply the force-induced vibration to the UAV comprises:
   moving the third one or more controllable components to apply a plurality of force-induced vibrations to the UAV, wherein each respective force-induced vibration of the plurality of force-induced vibrations is associated with a corresponding vibration frequency, and wherein the expected vibration profile represents an expected vibration of the UAV at the corresponding vibration frequency of each respective force-induced vibration.

4. The method of claim 2, wherein comparing the sensor data to the expected sensor data comprises:
   processing the vibration profile of the UAV using a machine learning model that has been trained using the expected vibration profile, wherein evaluating performance of the UAV comprises evaluating performance of the UAV based on an output of the machine learning model.

5. The method of claim 1, further comprising one or more of:
   based on evaluating performance of the UAV, causing the UAV to perform a flight operation; or
   based on evaluating performance of the UAV, scheduling maintenance of the UAV.

6. The method of claim 1, wherein the expected sensor data comprises values corresponding to the second one or more controllable components maintaining a stable orientation of the UAV while hovering.

7. The method of claim 1, wherein the sensor data comprises torque data indicative of torque applied by the UAV on the at least one axis while moving the second one or more controllable components, wherein comparing the sensor data to the expected sensor data comprises comparing the torque data to expected torque data.

8. The method of claim 7, wherein the first one or more controllable components comprise one or more of an aileron, an elevator, or a rudder, wherein the second one or more controllable components comprise a rotor of the UAV, and wherein the torque data is indicative of torque applied by the rotor on one or more of a roll axis, a pitch axis, or a yaw axis.

9. The method of claim 1, further comprising:

determining an operational condition associated with the UAV, wherein hovering the UAV in the environment comprises hovering the UAV in the environment based on determining the operational condition.

10. The method of claim 9, wherein determining the operational condition comprises:
processing, using a machine learning model, second sensor data collected during a flight operation of the UAV.

11. The method of claim 9, wherein determining the operational condition comprises one or more of:
detecting an environmental condition associated with flight performance of the UAV;
determining that an inactive period since a most recent flight operation of the UAV exceeds a threshold time period; or
determining that maintenance has been performed on the UAV between the most recent flight operation of the UAV and a current time.

12. The method of claim 11, wherein the environmental condition comprises one or more of:
a wind speed that is greater than a threshold wind speed,
a change in the wind speed that is greater than a threshold wind speed change since a most recent flight operation of the UAV,
a moisture level greater than a threshold moisture level,
a change in the moisture level that is greater than a threshold moisture level change since the most recent flight operation of the UAV,
a temperature greater than a threshold temperature, or
a change in the temperature that is greater than a threshold temperature change since the most recent flight operation of the UAV.

13. The method of claim 9, wherein determining the operational condition comprises:
comparing an in-flight parameter value of the UAV from a most recent flight to an expected in-flight parameter value, wherein the expected in-flight parameter value is different from the expected sensor data; and
determining a potential failure condition based on a difference between the in-flight parameter value and the expected in-flight parameter value being greater than or equal to a threshold difference.

14. The method of claim 1, further comprising:
prior to hovering the UAV and while the UAV is contacting a takeoff surface in the environment, pulsing a rotor of the UAV;
obtaining movement data indicative of movement of the UAV caused by pulsing the rotor; and
determining that the movement data falls within a threshold movement range, wherein hovering the UAV comprises hovering the UAV based on determining that the movement data falls within the threshold movement range.

15. A system comprising:
a processor;
a non-transitory computer readable medium having stored thereon instructions that, when executed by the processor, cause the processor to perform operations comprising:
causing an unmanned aerial vehicle (UAV) to hover in an environment;
while hovering the UAV, (i) causing movement of first one or more controllable components of the UAV in accordance with a predetermined sequence of movements to apply a force to the UAV and (ii), in response to moving the first one or more controllable components, causing movement of second one or more controllable components of the UAV to attempt to maintain at least one of a position or an orientation of the UAV along at least one axis by correcting for the force applied to the UAV by moving the first one or more controllable components;
obtaining, from one or more sensors of the UAV, sensor data indicative of a flight response of the UAV caused by moving the second one or more controllable components while hovering the UAV;
comparing the sensor data to expected sensor data associated with an expected flight response to the predetermined sequence of movements; and
based on comparing the sensor data to the expected sensor data, evaluating performance of the UAV.

16. The system of claim 15, further comprising:
moving third one or more controllable components of the UAV to apply a force-induced vibration to the UAV, wherein the sensor data is further indicative of a vibration profile of the UAV in response to the force-induced vibration, and wherein the expected sensor data comprises an expected vibration profile of the UAV in response to the force-induced vibration.

17. The system of claim 16, wherein moving third one or more controllable components of the UAV to apply the force-induced vibration to the UAV comprises:
moving the third one or more controllable components to apply a plurality of force-induced vibrations to the UAV, wherein each respective force-induced vibration of the plurality of force-induced vibrations is associated with a corresponding vibration frequency, and wherein the expected vibration profile represents an expected vibration of the UAV at the corresponding vibration frequency of each respective force-induced vibration.

18. The system of claim 16, wherein comparing the sensor data to the expected sensor data comprises:
processing the vibration profile of the UAV using a machine learning model that has been trained using the expected vibration profile, wherein evaluating performance of the UAV comprises evaluating performance of the UAV based on an output of the machine learning model.

19. The system of claim 15, wherein the expected sensor data comprises values corresponding to the second one or more controllable components maintaining a stable orientation of the UAV while hovering.

20. A non-transitory computer readable medium having stored thereon instructions that, when executed by a computing system, cause the computing system to perform operation comprising:
causing an unmanned aerial vehicle (UAV) to hover in an environment;
while hovering the UAV, (i) causing movement of first one or more controllable components of the UAV in accordance with a predetermined sequence of movements to apply a force to the UAV and (ii), in response to moving the first one or more controllable components, causing movement of second one or more controllable components of the UAV to attempt to maintain at least one of a position or an orientation of the UAV along at least one axis by correcting for the force applied to the UAV by moving the first one or more controllable components;
obtaining, from one or more sensors of the UAV, sensor data indicative of a flight response of the UAV caused by moving the second one or more controllable components while hovering the UAV;

comparing the sensor data to expected sensor data associated with an expected flight response to the predetermined sequence of movements; and based on comparing the sensor data to the expected sensor data, evaluating performance of the UAV.

\* \* \* \* \*